(12) United States Patent
Emizu et al.

(10) Patent No.: US 8,002,656 B2
(45) Date of Patent: Aug. 23, 2011

(54) TENSIONER FOR ENDLESS TRANSMISSION BELT

(75) Inventors: Osamu Emizu, Wako (JP); Hiroshi Yamaura, Wako (JP); Ryuta Niimura, Wako (JP); Yasuhiro Fukuyoshi, Wako (JP); Takao Kudo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 347 days.

(21) Appl. No.: 12/335,117

(22) Filed: Dec. 15, 2008

(65) Prior Publication Data
US 2009/0197721 A1    Aug. 6, 2009

(30) Foreign Application Priority Data

Jan. 31, 2008  (JP) ................................ 2008-022050

(51) Int. Cl.
*F16H 7/08* (2006.01)
(52) U.S. Cl. .................... 474/109; 474/110; 474/111
(58) Field of Classification Search .................. 474/101, 474/104, 109–111
See application file for complete search history.

(56) References Cited

U.S. PATENT DOCUMENTS

| | | | | |
|---|---|---|---|---|
| 7,070,528 B2 * | 7/2006 | Emizu et al. | .................. | 474/110 |
| 7,108,621 B2 * | 9/2006 | Ullein et al. | .................. | 474/101 |
| 7,699,730 B2 * | 4/2010 | Emizu et al. | .................. | 474/110 |
| 7,775,924 B2 * | 8/2010 | Koch | .................. | 474/110 |
| 2003/0216202 A1* | 11/2003 | Emizu et al. | .................. | 474/109 |
| 2006/0063625 A1* | 3/2006 | Emizu et al. | .................. | 474/110 |
| 2009/0197722 A1* | 8/2009 | Emizu et al. | .................. | 474/110 |

FOREIGN PATENT DOCUMENTS

JP    2000-170855    6/2000

* cited by examiner

*Primary Examiner* — Sang Kim
(74) *Attorney, Agent, or Firm* — Ditthavong Mori & Steiner, P.C.

(57) ABSTRACT

A tensioner for an endless transmission belt includes a plunger body and a plunger. The plunger is movably provided in the plunger body to press the endless transmission belt. A pressure chamber provided between the plunger and the plunger body is configured to store hydraulic oil supplied from an oil pump. A check valve is provided in the plunger body, configured to be opened to supply the hydraulic oil to the pressure chamber when a pressure in the pressure chamber is lower than an oil pressure from the oil pump, and configured to be closed when the pressure is higher than the oil pressure. A relief valve is provided in the plunger body within a width of the plunger in a direction orthogonal to a longitudinal direction of the plunger and configured to discharge the hydraulic oil in the pressure chamber when the pressure exceeds a predetermined value.

7 Claims, 9 Drawing Sheets

US 8,002,656 B2

TENSIONER FOR ENDLESS TRANSMISSION BELT

CROSS-REFERENCE TO RELATED APPLICATIONS

The present application claims priority under 35 U.S.C. §119 to Japanese Patent Application No. 2008-022050, filed Jan. 31, 2008. The contents of this application are incorporated herein by reference in their entirety.

FIELD OF THE INVENTION

The present invention relates to a tensioner for an endless transmission belt.

DISCUSSION OF THE BACKGROUND

A hydraulic tensioner is a tension maintaining mechanism based on a basic principle of pressing a plunger to an endless belt by means of a spring and the hydraulic pressure. Various hydraulic tensioners of different structures have been proposed thus far (see, for example, Japanese Patent Application Publication No. 2000-170855).

The contents of Japanese Patent Application Publication No. 2000-170855 are incorporated herein by reference in their entirety.

In FIG. 1 of Japanese Patent Application Publication No. 2000-170855, a hydraulic tensioner includes a tensioner body, a plunger, hydraulic chambers and, a relief passage, and a relief valve. A cylinder hole is formed in the tensioner body. The plunger is slidably and reciprocably fitted into the cylinder hole. The plunger sticks out of the head-end surface of the tensioner body, and is capable of pressing an endless flexible member for transmission. The hydraulic chambers are formed between the cylinder hole and the plunger. The hydraulic pressure of the hydraulic oil in the hydraulic chambers acts in a direction such as to make the plunger stick out. The relief passage communicates with the hydraulic chambers. The relief valve includes a relief spring and a valve body. The valve body opens and closes the relief passage in accordance with the difference between the force to close the valve generated by the biasing force of the relief spring and the force to open the valve exerted by the hydraulic pressure of the hydraulic chambers. The relief valve is provided not in the plunger but in the tensioner body.

Meanwhile, as FIG. 1 of Japanese Patent Application Publication No. 2000-170855 clearly shows, the relief valve is provided in the tensioner body, but is located away from the plunger in a direction that is orthogonal to the longitudinal direction of the plunger.

This placement of the relief valve outside of the plunger makes the size of the tensioner body larger in the direction that is orthogonal to the longitudinal direction of the plunger. As a consequence, the hydraulic tensioner is made larger in size.

To reduce the size of the internal combustion engine, it is desirable to make the tensioner even smaller in size.

SUMMARY OF THE INVENTION

According to one aspect of the present invention, a tensioner for an endless transmission belt includes a plunger body, a plunger, a plunger spring, a pressure chamber, a check valve, and a relief valve. The plunger body has a hole in which the plunger is movably provided. The plunger spring is disposed between the plunger and the plunger body to push the plunger toward the endless transmission belt to press the endless transmission belt. The pressure chamber is provided between the plunger and the plunger body and configured to store hydraulic oil supplied from an oil pump. The check valve is provided in the plunger body and configured to be opened to supply the hydraulic oil to the pressure chamber when a pressure in the pressure chamber is lower than an oil pressure of the hydraulic oil supplied from the oil pump and to be closed when the pressure in the pressure chamber is higher than the oil pressure. The relief valve is provided in the plunger body within a width of the plunger in a direction orthogonal to a longitudinal direction of the plunger and configured to discharge the hydraulic oil in the pressure chamber when the pressure in the pressure chamber exceeds a predetermined value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENT

Figure 1:
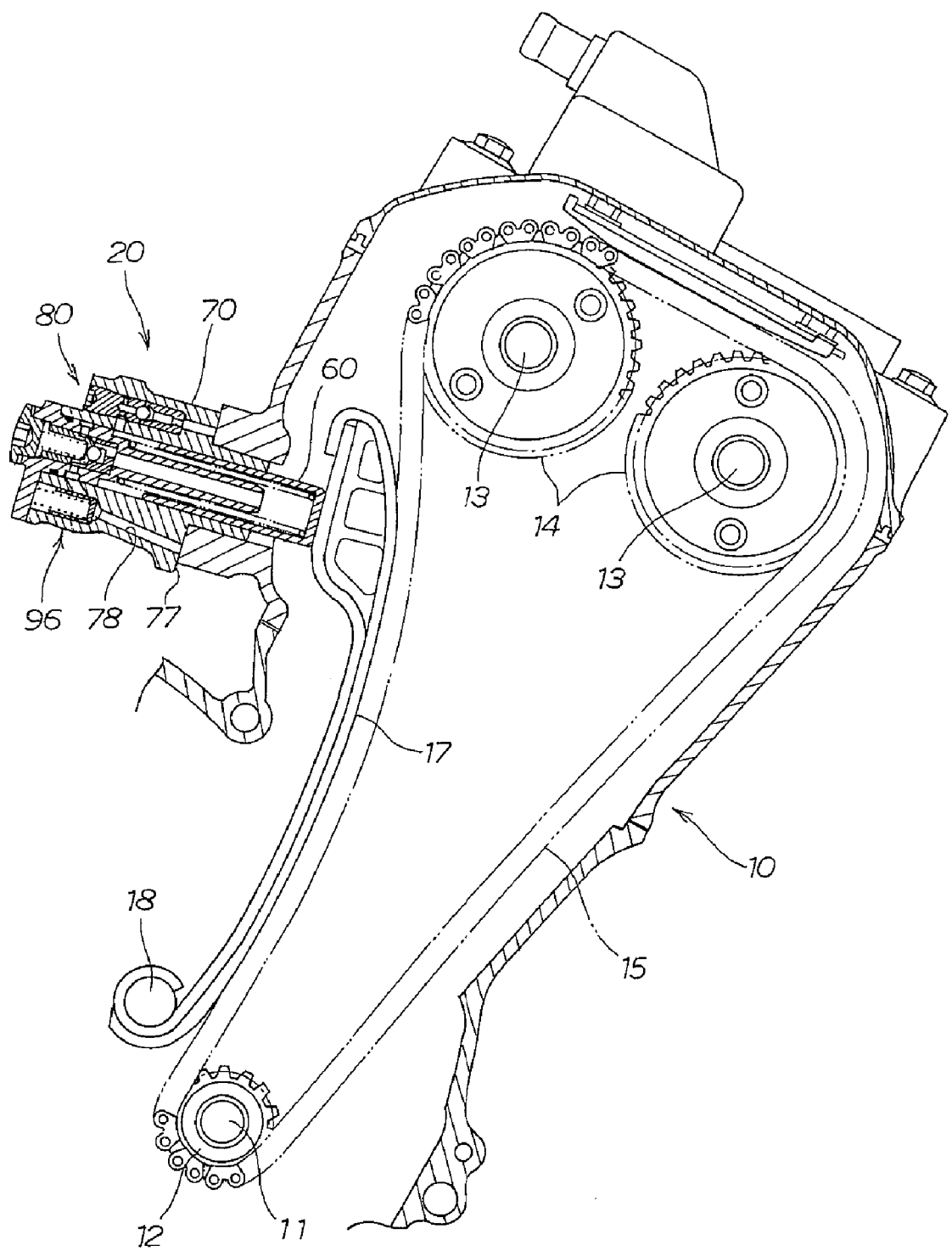
FIG. 1 is a front view of an internal combustion engine equipped with a tensioner for an endless transmission belt according to an embodiment of the present invention.

The embodiments will now be described with reference to the accompanying drawings, wherein like reference numerals designate corresponding or identical elements throughout the various drawings.

FIG. 1 is a front elevation view of an internal combustion engine equipped with a tensioner for an endless transmission belt according to an embodiment of the present invention. In an internal combustion engine 10, a drive sprocket 12 is provided on a crankshaft 11, each of driven sprocket 14 and 14 is provided on the corresponding one of a pair of cam shafts 13 and 13, and a cam chain 15 which is an endless transmission belt is looped around the three sprockets 12, and 14 and 14.

Now, suppose a case where the drive sprocket 12 rotates clockwise in the drawing. In this case, one of the sides of the cam chain 15 that is located on the right-hand side thereof becomes tight, and the driven sprockets 14 and 14 are made to rotate accordingly. The left-hand side, in the drawing, of the cam chain 15 becomes loose. Giving a tensile force to the loose side of the cam chain 15 to tighten this side can reduce the unsteady movement of the cam chain 15 at the time of starting the engine 10, at the time of acceleration, at the time of deceleration, and at the time of the reverse rotation.

Accordingly, the internal combustion engine 10 of this embodiment employs the following structure to give a tensile force to the cam chain 15. A tensioner shoe 17 is disposed on the loose side. The bottom end of the tensioner shoe 17 is made to serve as a pivot point 18 for swinging motion, and the upper side of the tensioner shoe 17 is pressed with a tensioner 20 for an endless transmission belt.

The structure of the tensioner 20 for an endless transmission belt will be described below in detail. The description starts with a description of the shape of each constituent element on the basis of various exploded views, and the description of the assembled state will be given after that.

Figure 2:
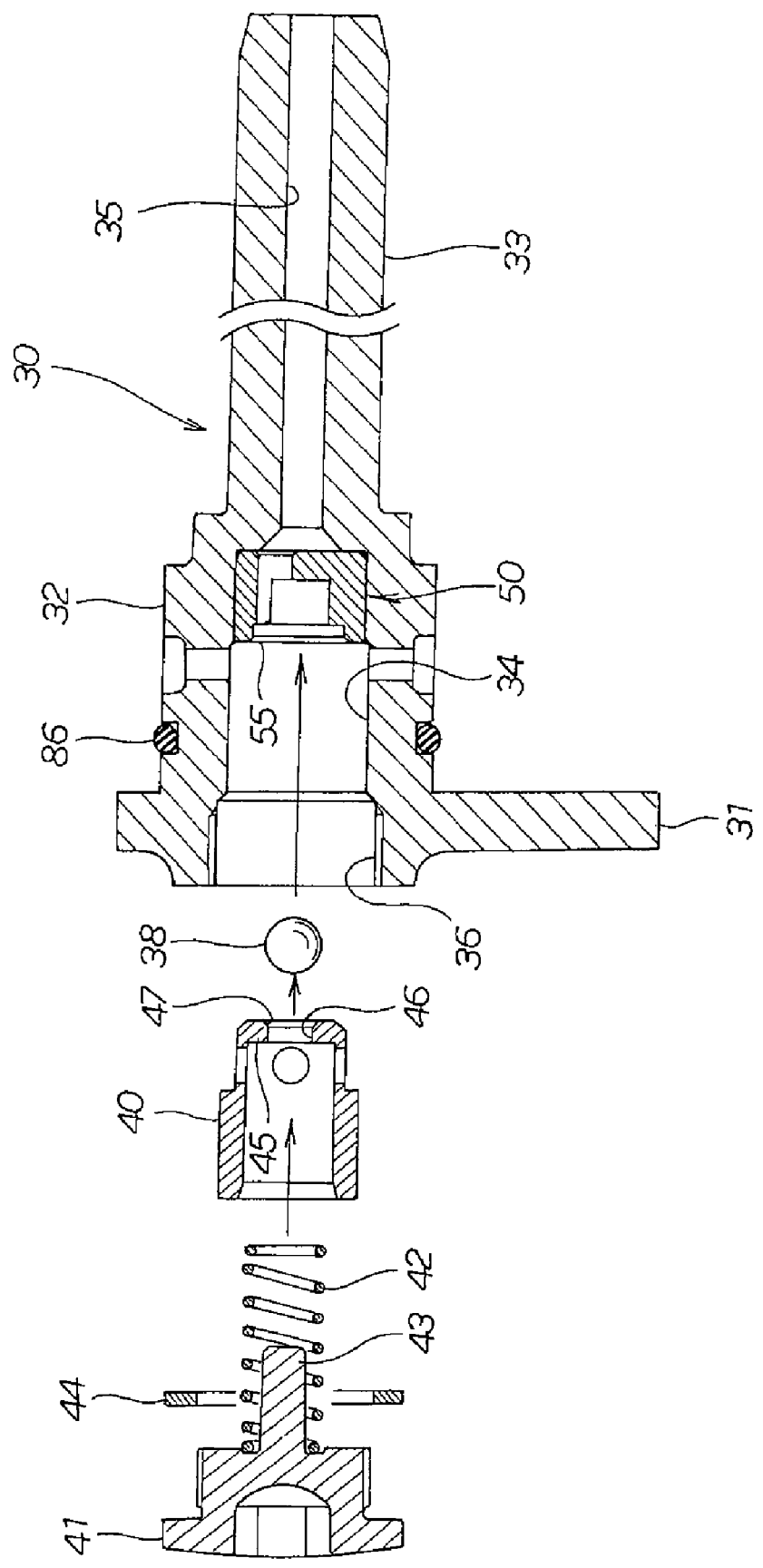
FIG. 2 is an exploded view of a segment body, a relief valve, and a check valve according to the embodiment of the present invention.

FIG. 2 is an exploded view of a segment body, a relief valve, and a check valve. The name "segment body" is employed because the component part referred to by this name is a part formed by dividing a plunger body, which will be described later.

The segment body 30 includes: a columnar portion 32 that includes a flange portion 31; a protruding portion 33 which has a smaller diameter than the columnar portion 32 and which extends from the columnar portion 32; a housing recessed portion 34 that is formed in the center of the columnar portion 32; a through hole 35 that is formed in the center of the protruding portion 33 so as to be contiguous from the housing recessed portion 34; and a female threaded portion 36 that is formed on the opening side of the housing recessed portion 34.

A valve guide 50 to guide a ball-shaped second valve body 38 is pressed to fit into the housing recessed portion 34. The second valve body 38 is inserted into the valve guide 50 (detailed description of these will be given later). A first valve body 40 of a shape of a tube with a bottom is inserted into the housing recessed portion 34 so as to keep the second valve body 38 in place. A lid member 41 is screwed into the female threaded portion 36, and keeps the first valve body 40 in place with a first spring 42 disposed in between. A pillar-shaped spring guide 43 protrudes out from the lid member 41. The spring guide 43 prevents the first spring 42 from moving out of place during the assembling work of the first spring 42. A reference numeral 44 denotes a ring-shaped shim that will be described later.

A through hole 46 is formed in a bottom 45 of the first valve body 40. The outer edge of the through hole 46 is chamfered to form a second valve seat portion 47. The ball-shaped second valve body 38 is brought into contact with this second valve seat portion 47.

Figure 3:
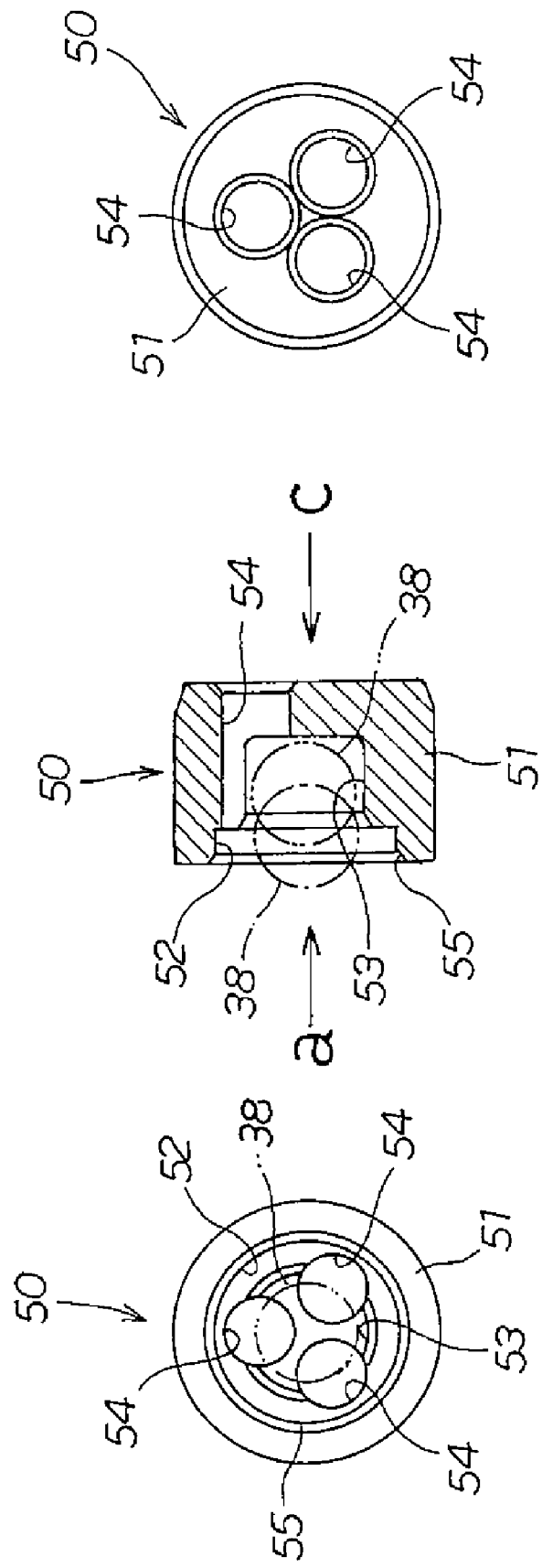
FIGS. 3A-3C are diagrams provided to describe the structure of a valve guide.

FIGS. 3A-3C show the structure of the valve guide 50. FIG. 3B is a cross-sectional view, FIG. 3A is a view seen as indicated by the arrow a of FIG. 3B, and FIG. 3C is a view seen as indicated by the arrow c of FIG. 3B.

FIG. 3A shows, the valve guide 50 includes a columnar body 51. The valve guide 50 also includes a large-diameter recessed portion 52 formed in the columnar body 51. In addition, the valve guide 50 includes a guide recessed portion 53 and plural (specifically, three in this embodiment) holes 54. The recessed portion 53 is formed in a portion that is deeper than the large-diameter recessed portion 52. The diameter of the guide recessed portion 53 is slightly larger than the second valve body 38, which is indicated by an imaginary line in the drawings. The holes 54 are formed so as to touch internally the large-diameter recessed portion 52.

As FIG. 3B shows, the second valve body 38 is guided so as to be capable of moving inside the guide recessed portion 53 as indicated by an imaginary line. The open end of the large-diameter recessed portion 52 is chamfered to form a first valve seat portion 55.

As FIG. 3C shows, the three holes 54 are formed in the columnar body 51.

As FIG. 3A shows, even though the second valve body 38 indicated by the imaginary line closes approximately half of the opening area of the holes 54, the rest of the openings is left unclosed. That is, there is no possibility of completely closing the holes 54 because the second valve body 38 moves inside the guide recessed portion 53 in front and back directions of the drawing.

Figure 4:
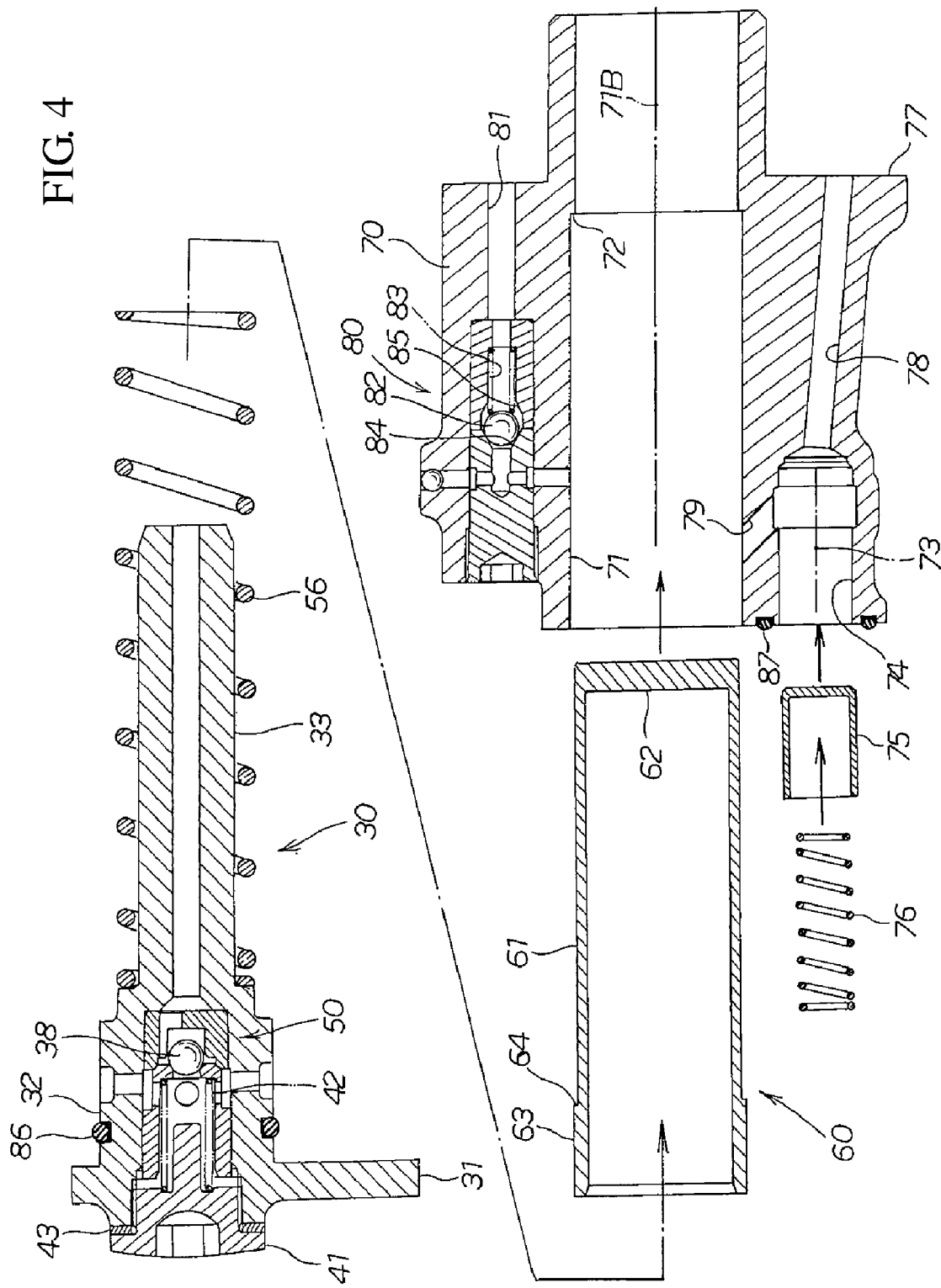
FIG. 4 is an exploded view of a plunger, a plunger body and a pressure retaining valve.

FIG. 4 is an exploded view of a plunger, a plunger body and a pressure retaining valve. A plunger 60 is a tubular body with a bottom, and includes a tubular portion 61 and a bottom portion 62 that closes an end (head end) of the tubular portion 61. The base portion of the plunger 60 has a slightly large diameter, and an end of this large-diameter portion 63 (right-hand side in the drawing) is formed to be a shoulder portion 64. As the figure shows, the plunger 60 is a member that has a simple shape, and the wall of tubular portion 61 is thin. Accordingly, the plunger 60 can be made lighter in weight.

A plunger body 70 is shown on the right-hand side of figure. An installation hole 71 is formed in the center of the plunger body 70 so as to penetrate the plunger body 70. The inner diameter of the installation hole 71 is designed to be equal to the outer diameter of the large-diameter portion 63 of the plunger 60. A stopper portion 72 is formed in the course of the installation hole 71, and the portion of the installation hole 71 beyond this stopper portion 72 (on the right-hand side of the figure) has a slightly smaller diameter than the diameter of the other part of the installation hole 71.

In addition, a retaining-valve installation chamber 74 is formed in parallel to the installation hole 71. A retaining-valve body 75 that has a shape with a bottom and a retaining spring 76 are disposed in this retaining-valve installation chamber 74.

A seat face 77 that abuts on the engine 10 is formed in the plunger body 70. An oil supply passage 78 is formed so as to extend from this seat face 77 and to reach the retaining-valve installation chamber 74. A first communication passage 79 is formed to communicatively connect the retaining-valve installation chamber 74 to the installation hole 71.

Reference numeral 73 denotes a longitudinal axis of the retaining-valve installation chamber 74, (also a longitudinal axis of the pressure retaining valve 96, which will be described later), and the longitudinal axis 73 is parallel to the longitudinal axis 71B of the installation hole 71.

In addition, an air purge valve 80 is formed in the plunger body 70 in parallel to the installation hole 71. An L-shaped purge channel 81 is formed so as to extend from the installation hole 71 and to reach the seat face 77. The air purge valve 80 is provided in the course of this L-shaped purge channel 81. The air purge valve 80 includes: a ball-shaped purge-valve body 82; a purge spring 83 that biases the purge-valve body 82 to a side so as to make the purge-valve body 82 move away from the seat face 77; a first purge-valve seat 84 that receives the purge-valve body 82 when the purge-valve body 82 is pressed by the purge spring 83; and a second purge-valve seat 85 that is formed at the opposite side of the purge-valve body 82 to the first purge-valve seat 84. The operation of the air purge valve 80 will be described later.

From the left-hand side of such an exploded view of the figure, the plunger 60 is inserted into the installation hole 71. The plunger 60 can be inserted to the maximum extent until the shoulder portion 64 abuts on the stopper portion 72. Then, the segment body 30 and a plunger spring 56 are assembled to the plunger body 70 in such a way as to insert the protruding portion 33 into the plunger 60. The configuration of this assembled body will be described with reference to the following figures.

Figure 5:
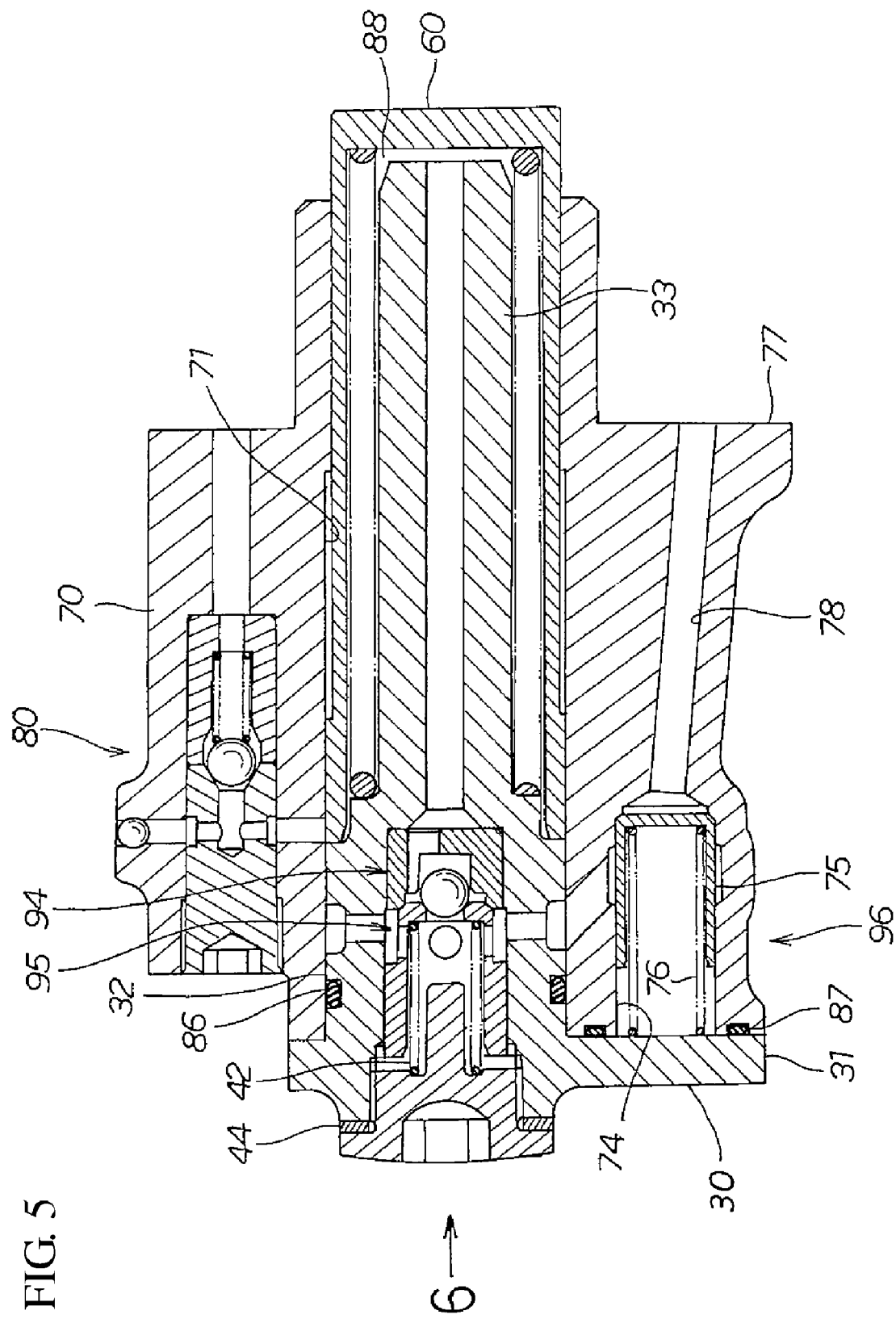
FIG. 5 is a cross-sectional view of the tensioner for an endless transmission belt according to the embodiment of the present invention.

FIG. 5 is a sectional view of the tensioner 20 for an endless transmission belt according to this embodiment of the present invention. The plunger 60 is installed in the installation hole 71 of the plunger body 70, and the segment body 30 is attached to the plunger 60 thus installed. Disposing an O-ring 86 between the installation hole 71 and the columnar portion 32 ensures the sealing therebetween. In addition, a seal material 87 is compressed by the flange portion 31, so that fluid in the retaining-valve installation chamber 74 is prevented from leaking out. Moreover, the setting of the first spring 42 and the setting of the stroke of a relief valve can be altered by changing the height of the shim 44.

In addition, the inside of the plunger 60 is a high-hydraulic-pressure chamber 88 in which the hydraulic oil is stored. The capacity of the high-hydraulic-pressure chamber 88 can be reduced by inserting the protruding portion 33 more deeply into the plunger 60.

Figure 6:
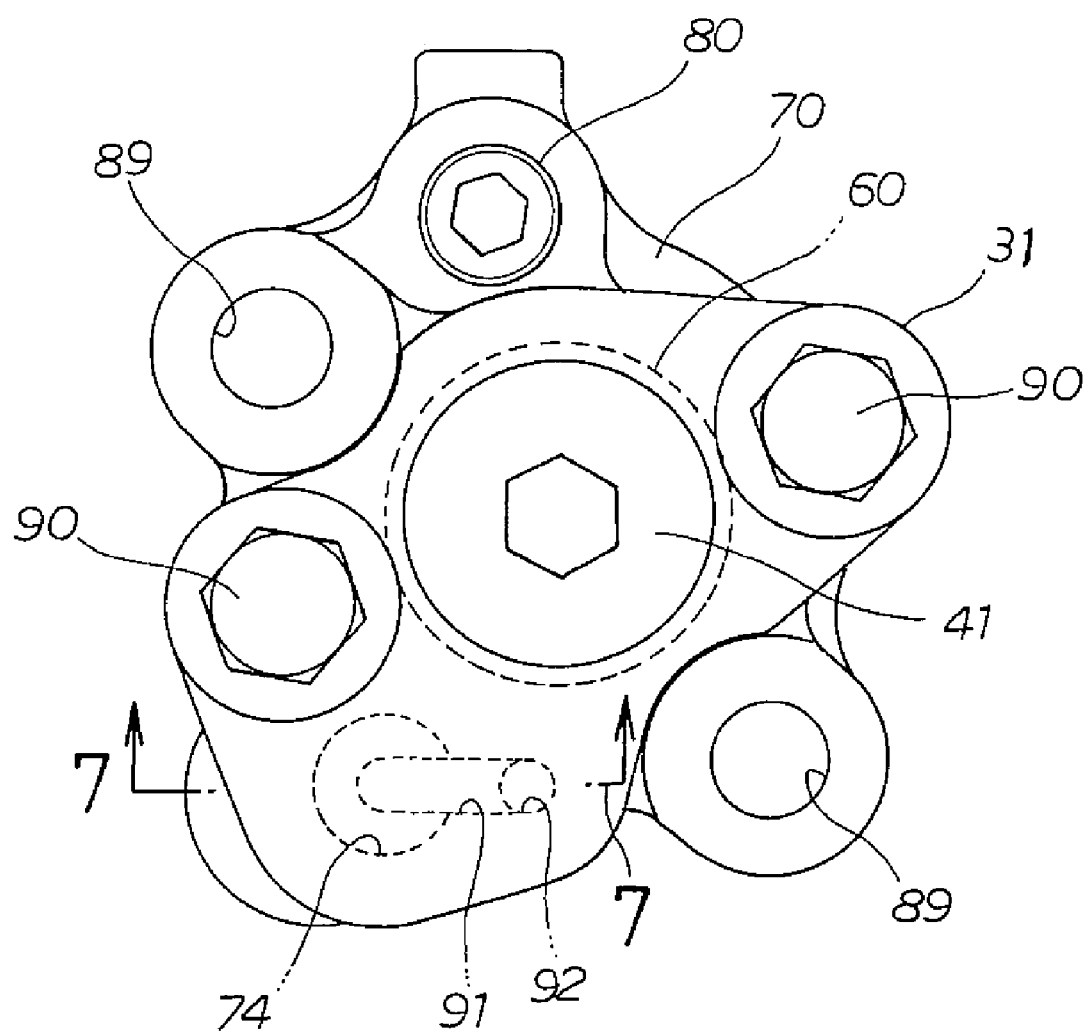
FIG. 6 is a view seen as indicated by the arrow 6 of FIG. 5.

FIG. 6 is a view seen as indicated by an arrow 6 of FIG. 5. A pair of attachment portions 89 and 89 are formed in the plunger body 70, which is located on the deeper side of the drawing. The attachment portions 89 and 89 are used when the plunger body 70 is fixed to the internal combustion engine 10. For example, the attachment portions 89 and 89 are bolt holes. The attachment portion 89 and 89 are formed at positions where the attachment portions 89 and 89 can avoid any interference with the air purge valve 80 located at a high position and with the retaining-valve installation chamber 74 located at a low position.

The flange portion 31, which extends obliquely in the figure, is fixed to the plunger body 70 by means of two bolts 90 and 90.

The air purge valve 80, the retaining-valve installation chamber 74, the attachment portions 89 and 89, and the bolts 90 and 90 are placed so as to surround the plunger 60, which is indicated by the dashed line. Such a placement allows the plunger body 70 to have a smaller outer diameter.

Figure 7:
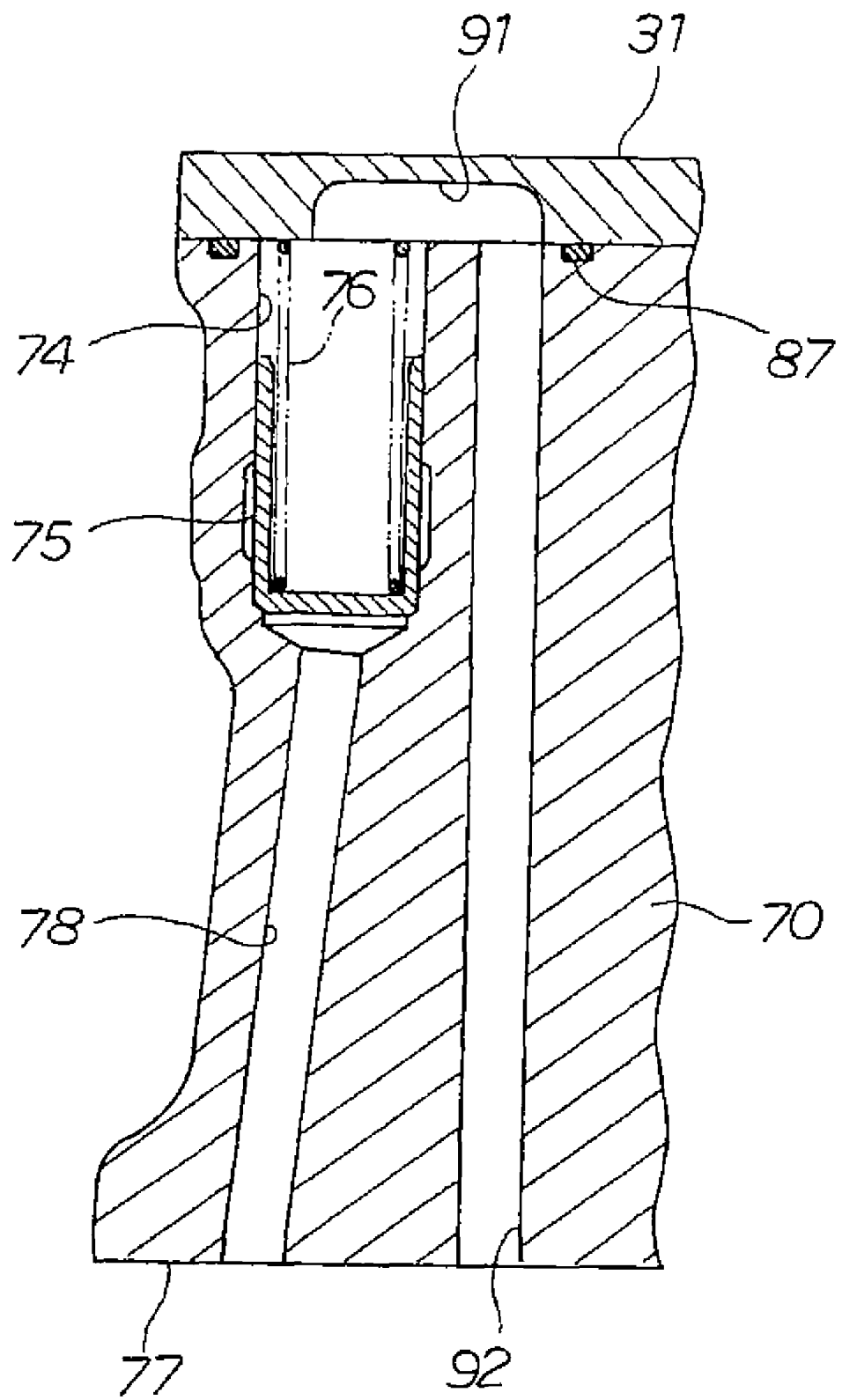
FIG. 7 is a cross-sectional view taken along the line 7-7 of FIG. 6.

FIG. 7 is a cross-sectional view taken along the line 7-7 of FIG. 6. A groove 91 is formed in the flange portion 31 so as to allow the fluid to escape from the upper side of the retaining-valve installation chamber 74. A communication passage 92 is formed in the plunger body 70 so as to extend from an end of the groove 92 and to reach the seat face 77. Note that, since the retaining-valve body 75 is only fitted in the retaining-valve installation chamber 74, a slight amount of oil may leak from the oil supply passage 78 to the retaining spring 76 side. When the leak oil is discharged via the groove 91 and the communication passage 92, the retaining-valve body 75 can move smoothly.

Moreover, since air inside the retaining-valve installation chamber 74 is not compressed, the retaining-valve body 75 moves more smoothly.

The operation of the tensioner for an endless transmission belt with the above-described configuration will be described below.

Figure 8:
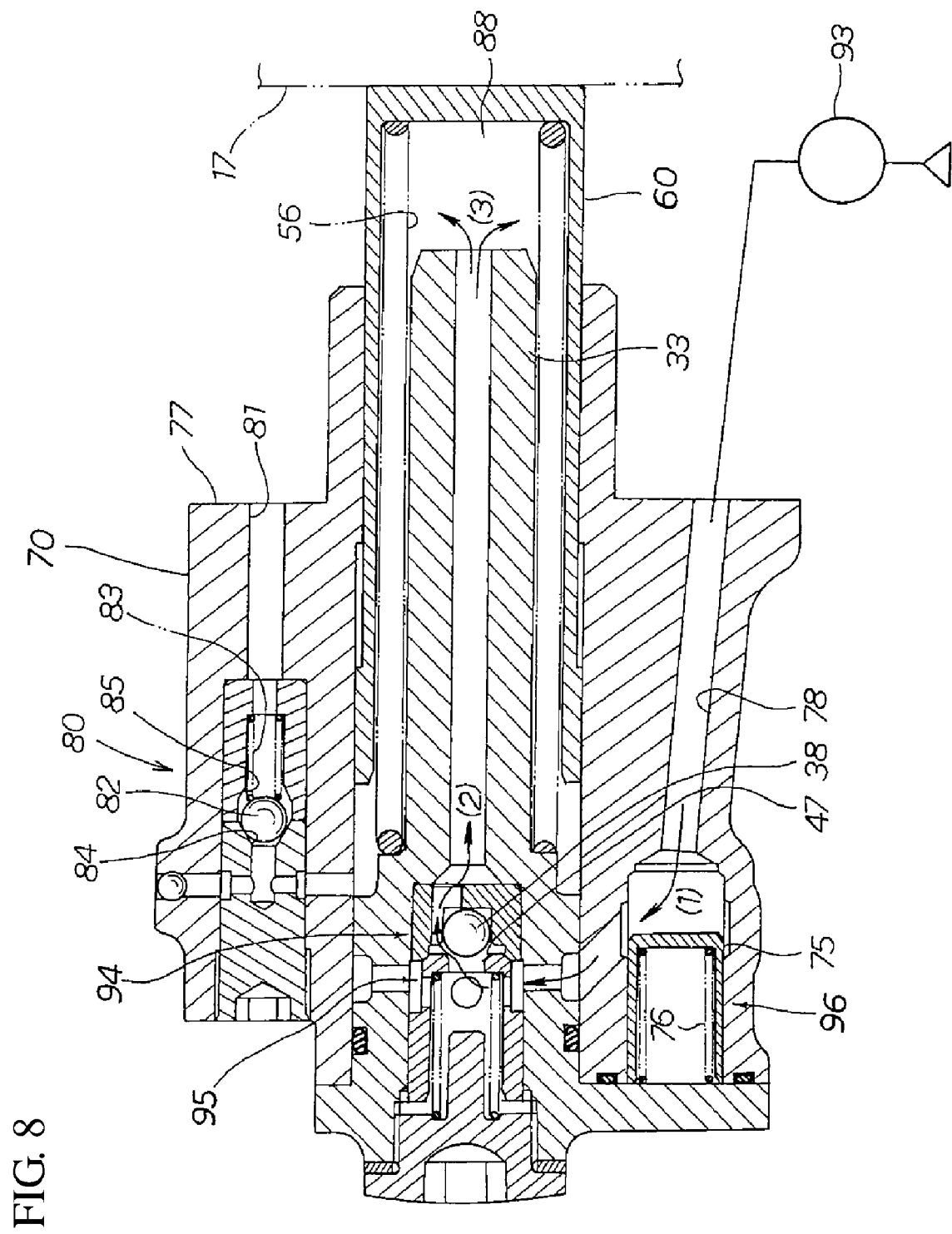
FIG. 8 is a diagram for describing the operation of the tensioner for an endless transmission belt.

FIG. 8 is a diagram for describing the operation of the tensioner for an endless transmission belt. Reference numeral 94 denotes a check valve, 95 denotes a relief valve, and 96 denotes a pressure retaining valve. The detail of these valves 94, 95, and 96 will be described later. The check valve 94 and the relief valve 95 are placed within the width (within the outer diameter) of the plunger 60. The placement of the relief valve 95 within the width of the plunger 60 allows the plunger body 70 to be made smaller in size in a direction that is orthogonal to the longitudinal direction of the relief valve 95. Accordingly, the tensioner can be made smaller in size.

In the configuration of the figure, once the oil pump 93 starts to operate, the oil pump 93 supplies the hydraulic oil of high pressure to the oil supply passage 78. Once the pressure of the hydraulic oil exceeds a certain level, the retaining-valve body 75 moves against the spring force of the retaining spring 76. Thus, the pressure retaining valve 96 is opened allowing the hydraulic oil to flow as indicated by the arrow (1) in the figure. The boll-shaped second valve body 38 is pushed by the hydraulic oil, and thus leaves the second valve seat portion 47. As a consequence, the hydraulic oil flows as indicated by the arrows (2) and (3), reaches the high-hydraulic-pressure chamber 88, and then is stored there.

Meanwhile, at the initial stage of the engine operation, air may remain in the high-hydraulic-pressure chamber 88. In this case, the air pushed by the hydraulic oil pushes the purge-valve body 82. Once the purge-valve body 82 moves rightward in the figure against the spring force of the purge spring 83, the air is discharged to the seat face 77 via the purge channel 81. When there remains no air, the purge-valve body 82 is pushed not by the air but directly by the hydraulic oil. The hydraulic oil, which has a much larger density than the air, pushes the purge-valve body 82 strongly. Accordingly, the purge-valve body 82 abuts on the second purge-valve seat 85. Thus, the purge channel 81 is closed. Henceforth, there is no possibility that the hydraulic oil leaks out to the seat face 77 side.

Moreover, there may be a case of a drastic decrease in the pressure of the high-hydraulic-pressure chamber 88. In this case, the purge-valve body 82 is biased by the purge spring 83 to reach the first valve seat 84. This eliminates the possibility that the air enters from the seat face 77 side to the high-hydraulic-pressure chamber 88.

In other words, the air purge valve 80 has an effect of preventing the outside air from entering inside and of discharging, selectively, the air to the seat face 77 side.

The plunger 60 advances forward until the combined force of the biasing force by the hydraulic oil and the biasing force of the plunger spring 56 equilibrates with the reaction force of the tensioner shoe 17 indicated by an imaginary line in the figure.

With an increase in the reaction force of the tensioner shoe 17, the plunger spring 56 is compressed, and the second valve body 38 moves leftward in the figure.

Figure 9A:
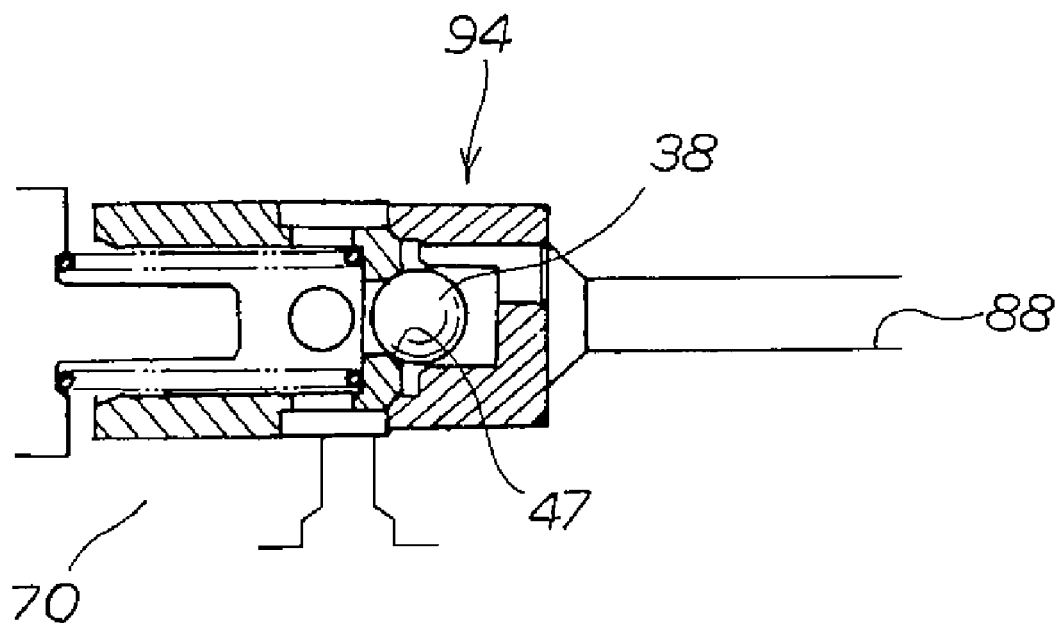
FIGS. 9A and 9B are diagrams illustrating respectively the operation of the check valve and the operation of the relief valve.
Figure 9B:
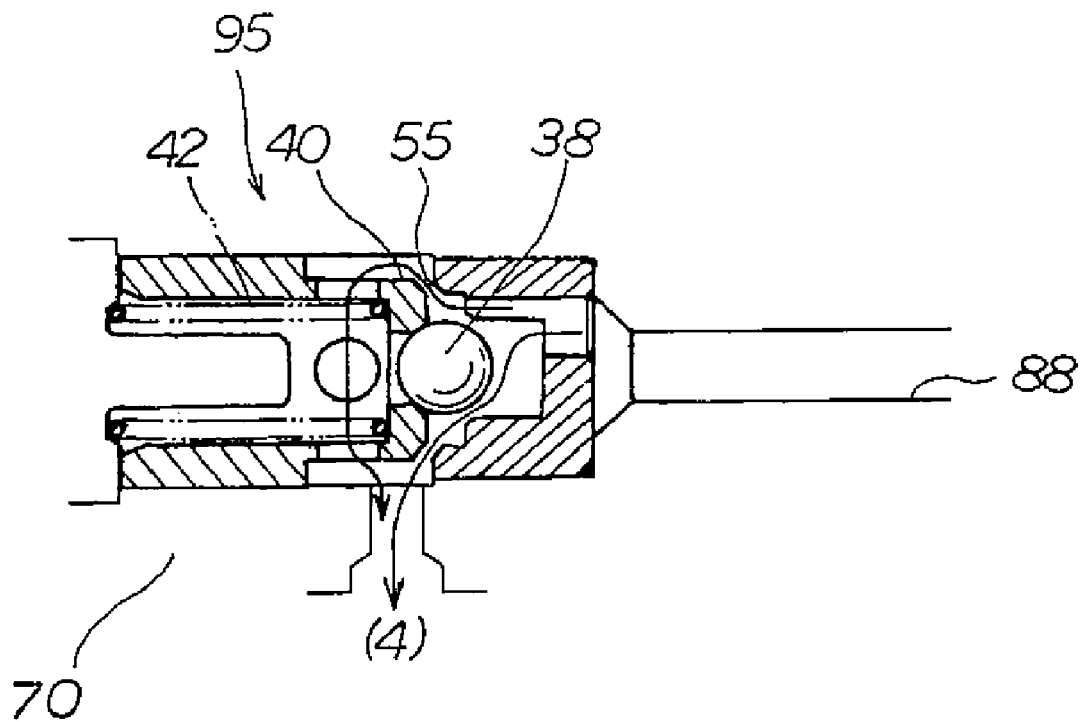

FIGS. 9A and 9B show a diagram illustrating the operation of the check valve 94 and the operation of the relief valve 95. As FIG. 9A shows, the movement of the hydraulic oil to the left-hand side in the drawing is blocked by the abutting of the second valve body 38 on the second valve-seat portion 47. The second valve-seat portion 47 and the second valve body 38 constitute the check valve 94 which prevents the backward flow.

In a case where the pressure of the high-hydraulic-pressure chamber 88 increases furthermore, as FIG. 9B shows, the first valve body 40 and the second valve body 38 together move to the left-hand side in the drawing against the spring force of the first spring 42. As a consequence, the first valve body 40 leaves the first valve-seat portion 55, and thus the hydraulic oil flows as indicated by the arrow (4). This hydraulic oil returns to the oil supply passage 78 shown in FIG. 8. Namely, the second valve body 38, the first valve body 40, the first valve-seat portion 55, and the first spring 42 combined together constitute the relief valve (pressure relief valve) 95.

In normal operation, the valves are in any one of the states shown in FIGS. 8, 9A and 9B. What is characteristic here is, particularly in FIG. 9B, the fact that the hydraulic oil discharged for the purpose of relieving the pressure returns back to the oil supply passage 78. In the conventional technique, the hydraulic oil is discharged to the internal combustion engine such as a cam-chain chamber. In contrast to the conventional technique, there is no possibility that the hydraulic oil is discharged to the cam-chain chamber. Accordingly, the hydraulic oil can be used efficiently, so that the load on the oil pump 93 can be alleviated.

Subsequently, the operation in the case of a decrease in the pressure of the oil supply passage 78 will be described below.

In the configuration of FIG. 8, once the engine 10 is stopped, the oil pump 93 ceased to operate so that the pressure of the oil supply passage 78 is decreased. Then, as a result of the biasing effect of the retaining spring 76, the retaining-valve body 75 moves to the right-hand side in the figure. As a consequence, the retaining-valve body 75 closes the oil supply passage 78 as FIG. 5 shows, and the hydraulic oil in the high-hydraulic-pressure chamber 88 does not return back to the oil supply passage 78. Accordingly, the pressure of the high-hydraulic-pressure chamber 88 is maintained. In this manner, the retaining-valve installation chamber 74, the retaining-valve body 75, and the retaining spring 76 which are provided in the oil supply passage 78 constitute the pressure retaining valve 96.

If the pressure retaining valve 96 is provided, the pressure of the high-hydraulic-pressure chamber 88 is prevented from decreasing, which would otherwise take place immediately after the engine 10 is stopped.

Moreover, as FIG. 8 shows, the relief valve 95 and the check valve 94 are placed so as to be adjacent to each other in the axial direction of the installation hole 71 (71B in FIG. 4).

The back-side face of the relief valve 95 (the left-hand-side face in FIG. 8) receives the pressure applied by the hydraulic oil pumped out from the oil pump 93. Accordingly, the pressure that is needed to open the relief valve 95 varies in accordance with the revolutions of the engine 10. With this configuration, the tensioner 20 can apply, on the cam chain 15, a pressure corresponding to the revolutions of the engine 10. To be more specific, the pressure of the hydraulic oil from the oil pump 93 increases as the revolutions of the engine 10 increase. Therefore, lower revolutions of the engine 10 are accompanied by a lower pressure needed to open the relief valve 95, while higher revolutions of the engine 10 are accompanied by a higher pressure needed to open the relief valve 95 so that the relief valve 95 is not easily opened.

The high-hydraulic-pressure chamber 88 stores the hydraulic oil pumped out from the oil pump 93. In addition, the high-hydraulic-pressure chamber 88 also plays a role of making the plunger 60 more difficult to be pushed back by the cam chain 15 and a role of pushing the plunger 60 out to the cam chain 15 side.

Now, a summary based on the description having been made thus far will be given below.

Now, a summary based on the description having been made thus far will be given below.

In the embodiment of the present invention, as FIG. 8 shows, both the check valve 94 and the relief valve 95 are provided in the plunger body 70. As a consequence, the plunger 60 can have a simple structure to have a lighter weight and smaller size.

In addition, the relief valve 95 is placed within the width of the plunger 60, so that the tensioner 20 can be made smaller in size in the direction that is orthogonal to the longitudinal direction of the relief valve 95.

In the embodiment of the present invention, the check valve 94 and the relief valve 95 shown in FIGS. 9A and 9B are provided in the segment body 30 that is to be inserted into the installation hole 71 shown in FIG. 4. For this reason, the segment body 30 equipped both with the relief valve 95 and with the check valve 94 can be inserted into the installation hole 71 in which the plunger 60 is to be installed. In comparison with a case where an installation hole for the plunger, an installation hole for the relief valve, and an installation hole for the check valve are individually formed in the plunger body, the plunger body 70 can be made smaller in size and can have a smaller diameter. Eventually, reduction in size of the tensioner 20 for an endless transmission belt can be achieved.

In the embodiment of the present invention, the through hole 46 is formed in the first valve body 40 shown in FIG. 2, and the second valve-seat portion 47 for the check valve 94 is formed also in the first valve body 40. In short, the two valves 94 and 95 share a part of their respective constituent parts. In comparison with a case where the relief valve and the check valve have their respective configurations that are independent of each other, the two valves 94 and 95 combined together in the embodiment of the present invention can reduce the number of constituent parts. Eventually, reduction in size of the tensioner 20 for an endless transmission belt can be achieved.

In the embodiment of the present invention, as FIG. 8 shows, the check valve 94 and the relief valve 95 are placed in the portion that is farther away from the endless transmission belt 15 than the plunger 60 is. In addition, the check valve 94 and the relief valve 95 are arranged along the axis 71B of the installation hole 71. To put it differently, the plunger 60, the check valve 94, and the relief valve 95 are arranged so as to form the same straight line. As a consequence, the plunger body 70 can have a smaller diameter.

In the embodiment of the present invention, as FIG. 2 shows, the installation recessed portion 34 is formed in the segment body 30. The installation recessed portion 34 has an opening located on a side that is opposite to the side facing the endless transmission belt 15 (the left-hand side of the figure). The check valve 94 and the relief valve 95 shown in FIGS. 9A and 9B are installed in the installation recessed portion 34, and the lid member 41 is provided to close the opening. The check valve 94 and the relief valve 95 can be taken out by removing the lid member 41. As a consequence, while the plunger body 70 is kept attached to the internal combustion engine 10 and the segment body 30 is kept attached to the plunger body 70, the inspection of and the exchange of the check valve 94 and the relief valve 95 can be done from the outside.

In short, the maintenance work can be carried out without entirely disassembling the tensioner 20 for an endless transmission belt. As a consequence, the efficiency of the maintenance work can be improved.

In the embodiment of the present invention, as FIG. 4 shows, the plunger 60 is formed as a tubular body with a bottom. In addition, the protruding portion 33 of the segment body 30 is inserted into the tubular body with a bottom. Accordingly, the internal capacity of the tubular body with a bottom can be decreased by the volume of the protruding portion 33. A smaller capacity of the high-hydraulic-pressure chamber 88 can improve the responsiveness of the plunger 60 triggered by the hydraulic pressure.

The embodiment of the present invention is suitable for a tensioner for an endless transmission belt provided as an adjunct in an internal combustion engine Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A tensioner for an endless transmission belt, comprising:
a plunger body having a hole;
a plunger movably provided in the hole of the plunger body;
a plunger spring disposed between the plunger and the plunger body to push the plunger toward the endless transmission belt to press the endless transmission belt;
a pressure chamber provided between the plunger and the plunger body and configured to store hydraulic oil supplied from an oil pump;
a check valve provided in the plunger body and configured to be opened to supply the hydraulic oil to the pressure chamber when a pressure in the pressure chamber is lower than an oil pressure of the hydraulic oil supplied from the oil pump and to be closed when the pressure in the pressure chamber is higher than the oil pressure; and
a relief valve provided in the plunger body within a width of the plunger in a direction orthogonal to a longitudinal direction of the plunger and configured to discharge the hydraulic oil in the pressure chamber when the pressure in the pressure chamber exceeds a predetermined value,
wherein the relief valve is disposed at a portion that is farther away from the endless transmission belt than the check valve, and
wherein the relief valve is disposed coaxially with an axis of the hole.

2. The tensioner for an endless transmission belt according to claim 1, wherein the plunger body comprises a segment body removably inserted into the hole, and wherein the check valve and the relief valve are provided in the segment body.

3. A tensioner for an endless transmission belt, said tensioner comprising:
a plunger body having a hole;
a plunger movably provided in the hole of the plunger body;
a plunger spring disposed between the plunger and the plunger body to push the plunger toward the endless transmission belt to press the endless transmission belt;
a pressure chamber provided between the plunger and the plunger body and configured to store hydraulic oil supplied from an oil pump;
a check valve provided in the plunger body and configured to be opened to supply the hydraulic oil to the pressure chamber when a pressure in the pressure chamber is lower than an oil pressure of the hydraulic oil supplied from the oil pump and to be closed when the pressure in the pressure chamber is higher than the oil pressure; and
a relief valve provided in the plunger body within a width of the plunger in a direction orthogonal to a longitudinal direction of the plunger and configured to discharge the hydraulic oil in the pressure chamber when the pressure in the pressure chamber exceeds a predetermined value,
wherein the plunger body comprises a segment body removably inserted into the hole, and wherein the check valve and the relief valve are provided in the segment body.

4. The tensioner for an endless transmission belt according to claim 3,
wherein the relief valve comprises
a first valve-seat portion provided in the segment body,
a first valve body that abuts on the first valve-seat portion, and
a first spring that presses the first valve body onto the first valve-seat portion, and
wherein the check valve comprises
a second valve-seat portion provided at an edge located on a pressure chamber side of a through hole formed in the first valve body, and
a second valve body provided to face the second valve-seat portion and being pushed to close the second valve-seat portion by the pressure in the pressure chamber when the pressure in the pressure chamber becomes higher than a second predetermined value.

5. The tensioner for an endless transmission belt according to claim 3, wherein the check valve and the relief valve are disposed at a portion that is farther away from the endless transmission belt than the plunger is, and are disposed along an axis of the hole.

6. The tensioner for an endless transmission belt according to claim 3, wherein the segment body includes an installation recessed portion having an opening located on a side opposite to the endless transmission belt, the opening being closed by a lid member, and wherein the check valve and the relief valve are provided in the installation recessed portion.

7. The tensioner for an endless transmission belt according to claim 3,
wherein the plunger is a tubular body with a bottom, which comprises
a tubular portion extending along the hole, and
a bottom portion closing the head end of the tubular portion,
wherein the segment body comprises a protruding portion which extends into the tubular portion, and which projects from the hole toward the endless transmission belt, and
wherein the plunger spring is disposed between the protruding portion and the tubular portion.

* * * * *